(12) United States Patent
Lee

(10) Patent No.: US 10,296,143 B2
(45) Date of Patent: May 21, 2019

(54) TOUCH SENSING DEVICE AND SENSING METHOD OF TOUCH POINT

(71) Applicants: SALT INTERNATIONAL CORP., New Taipei (TW); IMAGINATION BROADWAY LTD., New Taipei (TW)

(72) Inventor: Shang-Li Lee, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 0 days.

(21) Appl. No.: 15/692,719

(22) Filed: Aug. 31, 2017

(65) Prior Publication Data

US 2018/0067616 A1 Mar. 8, 2018

(30) Foreign Application Priority Data

Sep. 5, 2016 (TW) .............................. 105128687 A

(51) Int. Cl.
*G06F 3/041* (2006.01)
*G06F 3/042* (2006.01)
*G06F 3/044* (2006.01)

(52) U.S. Cl.
CPC ............ *G06F 3/0428* (2013.01); *G06F 3/044* (2013.01); *G06F 3/0416* (2013.01); *G06F 3/0418* (2013.01); *G06F 3/0412* (2013.01); *G06F 2203/04104* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2014/0184572 A1* | 7/2014 | Ito ......................... | G06F 3/0418 345/178 |
| 2015/0205400 A1* | 7/2015 | Hwang ................... | G06F 3/044 345/654 |
| 2016/0266674 A1* | 9/2016 | Schropp, Jr. .......... | G06F 3/0488 |

* cited by examiner

*Primary Examiner* — Carl Adams
(74) *Attorney, Agent, or Firm* — Andrew M. Calderon; Roberts Mlotkowski Safran Cole & Calderon, P.C.

(57) ABSTRACT

A sensing method of touch point includes: detecting an edge region to obtain one or more effective touch point; and determining whether the effective touch point is a valid touch point according to a number of the effective touch point(s) and an area of each of the effective touch point(s). The valid touch point is the effective touch point with the number being equal to 1 and the area satisfying a size condition.

16 Claims, 7 Drawing Sheets

TOUCH SENSING DEVICE AND SENSING METHOD OF TOUCH POINT

CROSS-REFERENCE TO RELATED APPLICATION

This non-provisional application claims priority under 35 U.S.C. § 119(a) to Patent Application No. 105128687 filed in Taiwan, R.O.C. on Sep. 5, 2016, the entire contents of which are hereby incorporated by reference.

BACKGROUND

Technical Field

The instant disclosure relates to a touch sensing technique and, more particularly, to a touch sensing device and a sensing method of touch point.

Related Art

For convenience of use, touch screens, are adopted as operating interfaces by more and more electronic devices. Users can touch an image on a touch screen to control an electronic device. Since the touch screen provides visual feedback, the control of the electronic device is easier for users. A touch screen generally includes a display for a displaying function and a touch sensing device for a touch control function. Regarding the touch control, a user can touch a touch screen with his or her fingertip or a stylus to control an electronic device. The electronic device can define a gesture performed by the user according to variations of coordinates of touch points or variations of numbers of touch points and then execute a corresponding function according to the gesture.

When a user controls an electronic device by a touch screen, the user's palm may contact or be too close to the touch screen due to the user's writing habit or because the user holds the electronic device by his or her hand to use the touch screen. In such cases, the system of the electronic device may generate a false detection due to the user's palm causing errors during writing.

In order to avoid the false detection caused by a user's palm without any influence of using a touch screen, the false detection caused by the user's palm must be eliminated in advance. Therefore, people in the art keep researching and developing to find a way to effectively avoid the false detections caused by users' palms.

SUMMARY

According to an embodiment of the instant disclosure, a sensing method of touch point comprises: detecting an edge region to obtain at least one effective touch point; and determining whether the at least one effective touch point is a valid touch point according to a number of the at least one effective touch point and an area of each of the at least one effective touch point. Wherein, the valid touch point is the at least one effective touch point with the number being equal to 1 and the area satisfying a size condition.

According to an embodiment of the instant disclosure, a touch sensing device comprises a plurality of first electrode lines, a plurality of second electrode lines, and a sensing controller. The first electrode lines and the second electrode lines intersect to define a plurality of sensing points arranged as a matrix. The sensing points form a sensing region. The sensing controller is electrically connected with the first electrode lines and the second electrode lines. The sensing controller processes: detecting an edge region of the sensing region to obtain at least one effective touch point and determining whether the at least one effective touch point is a valid touch point according to a number of the at least one effective touch point and an area of each of the at least one effective touch point. Wherein, each of the at least one effective touch point is formed by the sensing points adjacent to one another, and the valid touch point is the at least one effective touch point with the number being equal to 1 and the area satisfying a size condition.

Concisely, the touch sensing device and the sensing method of touch point according to the instant disclosure can be utilized to determine whether a touch event is caused by a palm so as to eliminate false detections caused by palms.

DETAILED DESCRIPTION

First, a touch sensing device and a sensing method of touch point according to any embodiment of the instant disclosure can be applied to touch equipment. The touch equipment may be, but is not limited to, an electronic device with a touch control function such as a touch screen, an electronic drawing board, a writing board, a smart phone, a portable navigation device (PND), a digital photo frame (DPF), an e-book, a laptop computer, a tablet computer, or a pad computer. For example, in cases of a touch screen applied, "touch events" described in following embodiments may occur by contact of a fingertip or a stylus. In cases of an electronic drawing board applied, touch events may occur by contact of a corresponding touch element (e.g., a touch brush) corresponding to the electronic drawing board. In cases of a writing board applied, touch events may occur by contact of a corresponding touch element (e.g., a writing pen or a fingertip) corresponding to the writing board.

Figure 1:
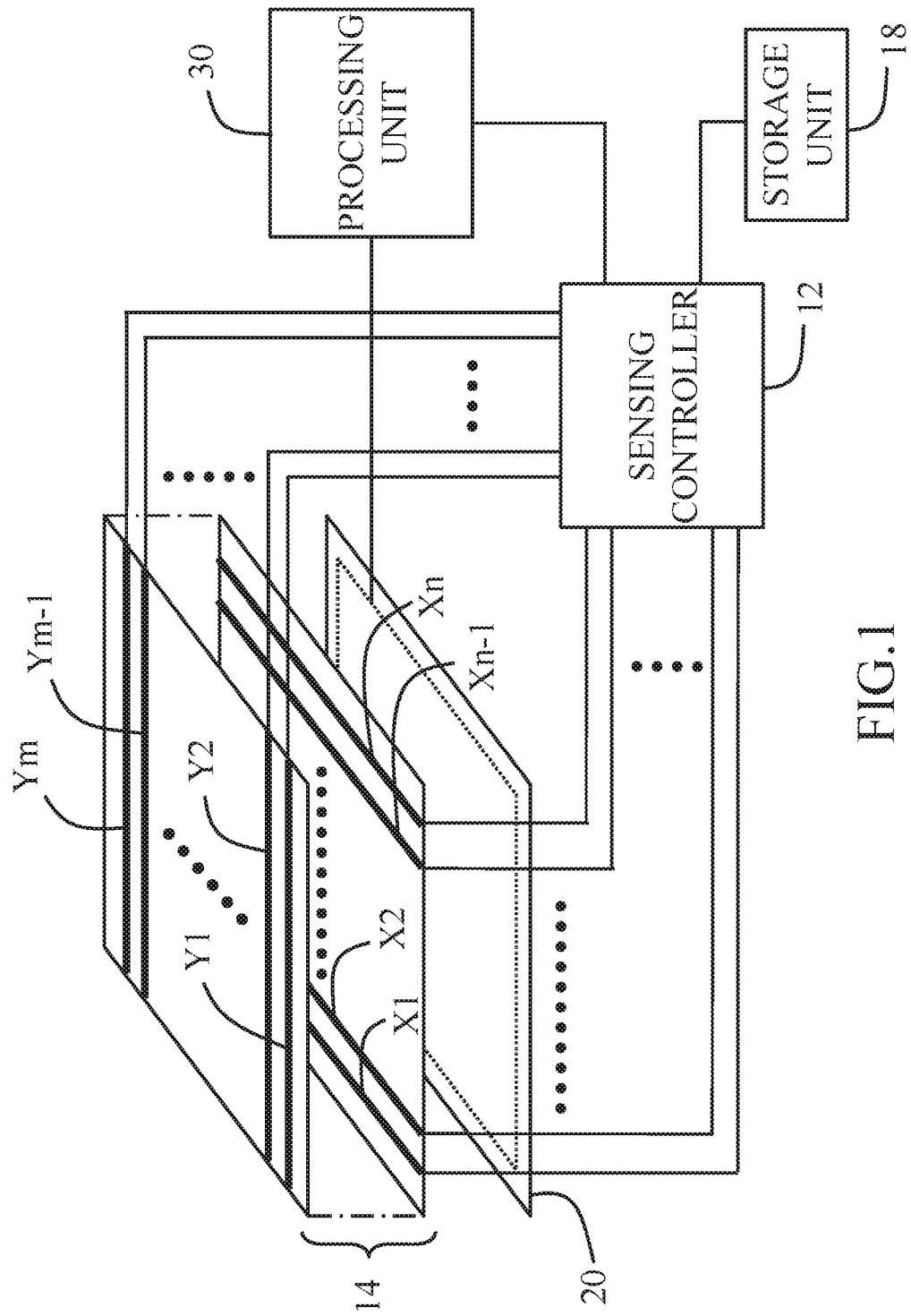
FIG. 1 illustrates a diagram of touch equipment of a touch sensing device according to any embodiment of the instant disclosure.
Figure 2:
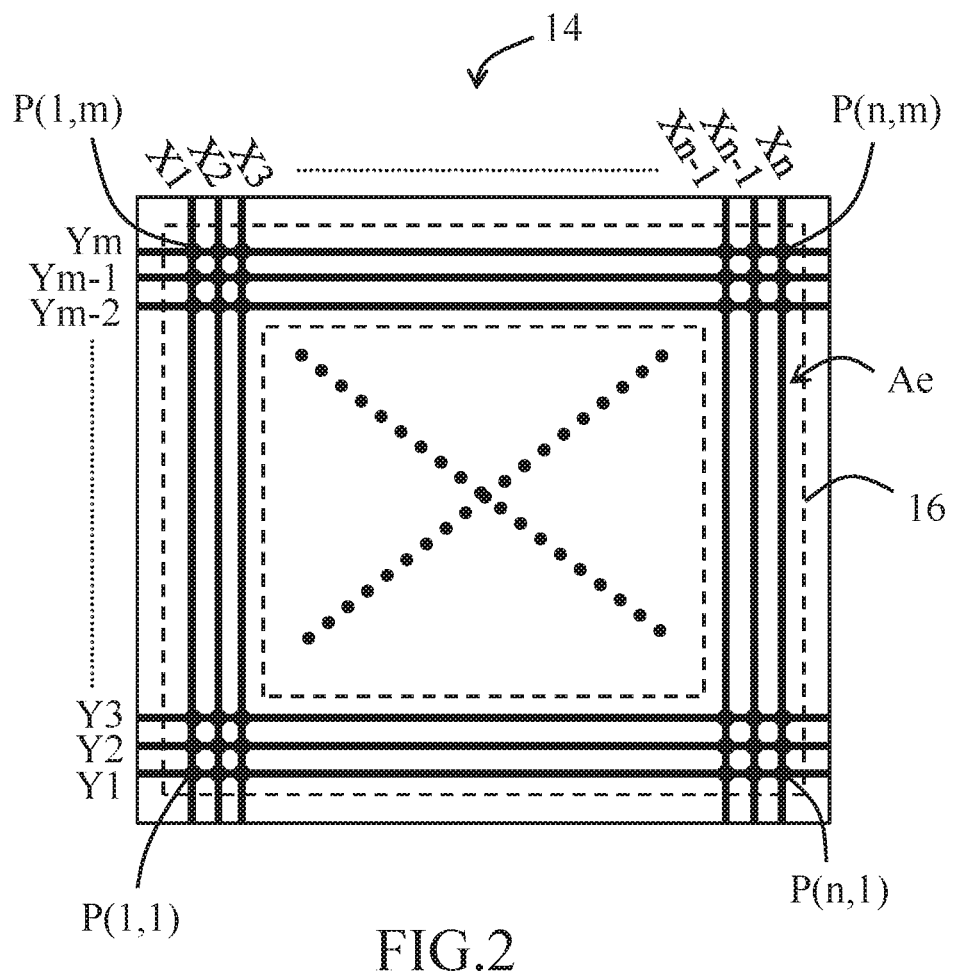
FIG. 2 illustrates a diagram of a signal sensor of FIG. 1 according to an embodiment.

FIG. 1 is a diagram of touch equipment of a touch sensing device according to any embodiment of the instant disclosure. FIG. 2 is a diagram of a signal sensor of FIG. 1 according to an embodiment. In the following illustration, the touch equipment is, but is not limited to, an electronic device.

Please refer to FIG. 1. The touch equipment comprises a touch sensing device, a display 20, and a processing unit 30. The touch sensing device comprises a sensing controller 12 and a signal sensor 14. The sensing controller 12 is connected to the signal sensor 14. The signal sensor 14 is positioned on a displaying surface of the display 20. The processing unit 30 is electrically connected to the sensing controller 12 and the display 20. The signal sensor 14 comprises a plurality of electrode lines (e.g., the first electrode lines X1-Xn and the second electrode lines Y1-Ym) intersecting one another. Wherein, n and m are positive integers. In addition, n may be equal to m or not equal to m. The first electrode lines X1-Xn and the second electrode lines Y1-Ym are electrically connected to the sensing controller 12.

From a top view, the first electrode lines X1-Xn and the second electrode lines Y1-Ym intersect one another to define a plurality of sensing points P(1,1)-P(n, m) which are arranged as a matrix, as shown in FIG. 2. The sensing points P(1,1)-P(n, m) form a sensing region 16.

In some embodiments, the first electrode lines X1-Xn and the second electrode lines Y1-Ym having intersected form a rhombus nest shape, a grill shape, or a grid shape. In some embodiments, the first electrode lines X1-Xn and the second electrode lines Y1-Ym can be at different planes (as shown in FIG. 1), i.e., at multiple sensing layers. There is, but is not limited to, an insulating layer (not shown) between the sensing layers. In some embodiments, the first electrode lines X1-Xn and the second electrode lines Y1-Ym can be at the same plane (not shown), i.e., at a single sensing layer. In some embodiments, the first electrode lines X1-Xn are receiving electrode lines, and the second electrode lines Y1-Ym are transmitting electrode lines. In some embodiments, the sensing layer may be a patterned conductive film, e.g., an ITO film.

In some embodiments, the signal sensor 14 can be transparent or translucent. When the display 20 displays information, a user can read the information displayed on the display 20 through the signal sensor 14. In other words, the light emitted by the display 20 can penetrate through the signal sensor 14 and reach the user's eyes. In some other embodiments, the signal sensor 14 can be neither transparent nor translucent. For example, the signal sensor 14 pertains to touch equipment without the display 20 such as an electronic drawing board or a writing board.

When a user touches the touch equipment, the touch sensing device detects a touch event (from a touch movement) through the sensing region 16, and the processing unit 30 further processes based upon position information corresponding to the touch event. The content being further processed is determined based upon a position of the display 20 on which the touch event has occurred, and the position is corresponding to an application. For example, the processing unit 30 activates an application or displays a pen mark on the position where the touch event has occurred in response to the touch event. In some embodiments, the processing unit 30 may be an internal processor or an external processor installed in an external mainframe.

In the embodiment, the sensing controller 12 may apply a self-capacitance touch technique or mutual capacitance touch technique to detect touch movements of users by the signal sensor 14. In addition to detect normal touch movements, the sensing controller 12 further determines whether a touch movement is from user's palm so as to eliminate false detections of touch movements caused by palms.

Figure 3:
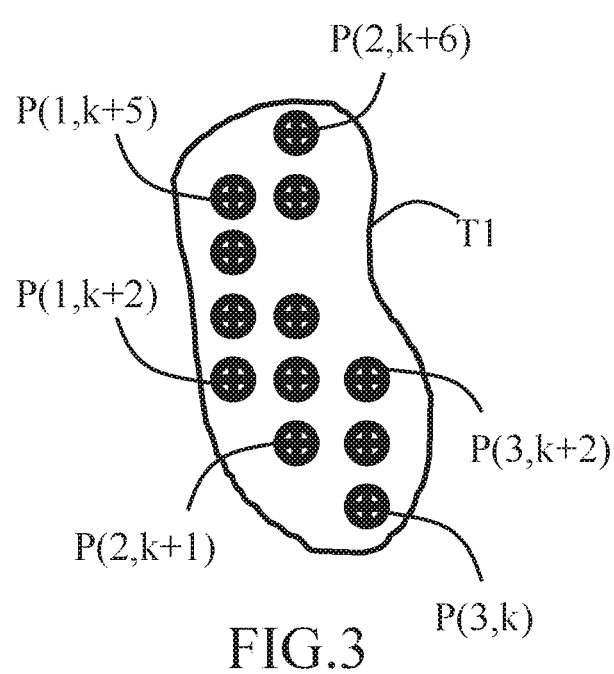
FIG. 3 illustrates a diagram of effective touch points according to an embodiment.
Figure 4:
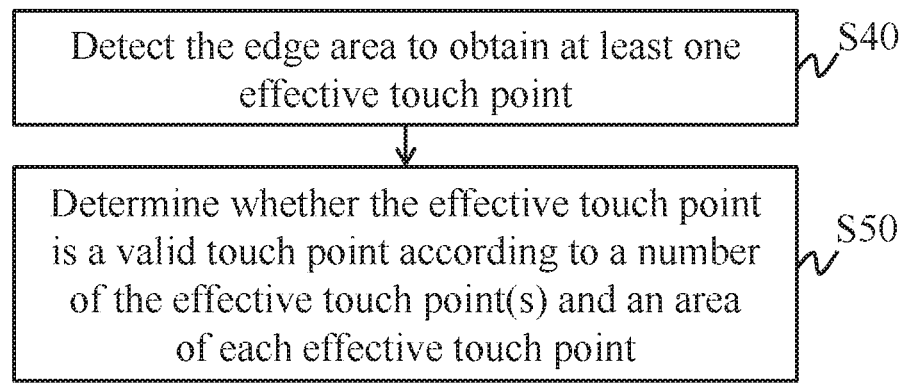
FIG. 4 illustrates a flow chart of a sensing method of touch point according to an embodiment of the instant disclosure.

FIG. 3 is a diagram of effective touch points according to an embodiment. FIG. 4 is a flow chart of a sensing method of touch point according to an embodiment of the instant disclosure.

Please refer to FIGS. 1-4. A predetermined range of a perimeter of the sensing region 16 is defined as an edge region Ae (i.e., the area between the two dotted frames). During a touch sensing process, the sensing controller 12 scans the electrode lines. The sensing controller 12 detects the edge region Ae by scanning the electrode lines to obtain at least one effective touch point T1 (as shown in FIG. 3) (step S40). Each effective touch point T1 is formed by the sensing points P(1,k+2)-P(1,k+5), P(2,k+1)-P(2,k+6), P(3, k)-P(3,k+2) adjacent to one another. Wherein, K is a positive integer ranges from 1 to (m−6).

In some embodiments, the edge region Ae is a sensing block formed by the first electrode lines of the first electrode lines X1-Xn near a first side of the touch sensing device (the sensing region 16), the first electrode lines of the first electrode lines X1-Xn near a second side of the touch sensing device (the sensing region 16), the second electrode lines of the second electrode lines Y1-Ym near a third side of the touch sensing device (the sensing region 16), and the second electrode lines of the second electrode lines Y1-Ym near a fourth side of the touch sensing device (the sensing region 16). In cases where the predetermined range is a range including three electrode lines on the perimeter of the sensing region 16, the edge region Ae is the sensing block formed by the first electrode lines X1, X2, X3, Xn−2, Xn−1, and Xn and the second electrode lines Y1, Y2, Y3, Ym−2, Ym−1, and Ym.

Next, the sensing controller 12 performs a determination process of valid touch point on the effective touch point(s) having been detected. During the determination process of valid touch point, the sensing controller 12 determines whether the effective touch point(s) is a valid touch point according to a number of the effective touch point(s) and an area of each of the effective touch point(s) (step S50).

Figure 5:
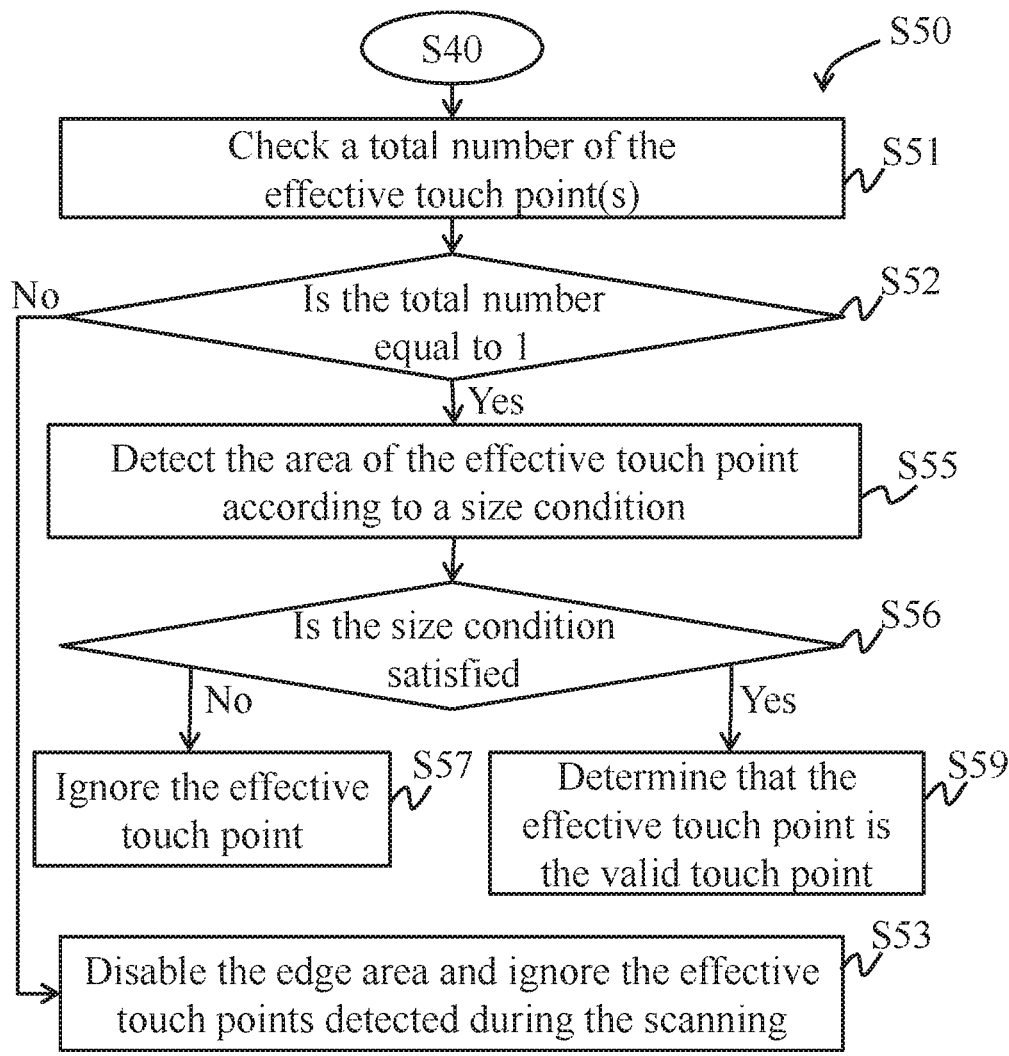
FIG. 5 illustrates a detailed flow chart of step S50 according to an embodiment.

FIG. 5 is a detailed flow chart of the step S50 according to an embodiment.

Please refer to FIG. 5. In an embodiment of the step S50, the sensing controller 12 checks a total number of the effective touch point(s) (step S51) on the edge region Ae having been detected during a scanning to determine whether the total number of the effective touch point(s) is equal to 1 (step S52).

When the total number of the effective touch point(s) is not equal to 1 (in the embodiment, the total number is greater than 1), the sensing controller 12 disables the edge region Ae and ignores the effective touch points having been detected during the scanning (step S53). In the embodiment, ignoring the effective touch points means that the sensing controller 12 does not output position information corresponding to the effective touch points to post stage components, e.g., the processing unit 30.

In an embodiment of the step S53, the sensing controller 12 does not drive the electrode lines within the edge region Ae to disable the edge region Ae. In another embodiment of the step S53, the sensing controller 12 does not sense the electrode lines within the edge region Ae to disable the edge region Ae. That is, the sensing controller 12 does not receive the signals from the electrode lines within the edge region Ae. In yet another embodiment of the step S53, the sensing controller 12 does not output the effective touch point(s) determined by through detecting the edge region Ae to disable the edge region Ae.

When the total number of the effective touch point is equal to 1, the sensing controller 12 detects the area of the effective touch point according to a size condition (step S55) to determine whether the area of the effective touch point satisfies the size condition (step S56).

When the area of the effective touch point does not satisfy the size condition, the sensing controller 12 ignores the effective touch point (step S57). That is to say, the detection of the effective touch point is a false detection (which may be caused by an unintended touch movement). In contrast, when the area of the effective touch point satisfies the size condition, the sensing controller 12 determines that the effective touch point is the valid touch point (step S59). That is to say, the detection of the effective touch point is a true detection (which is caused by an intended touch movement).

Figure 6:
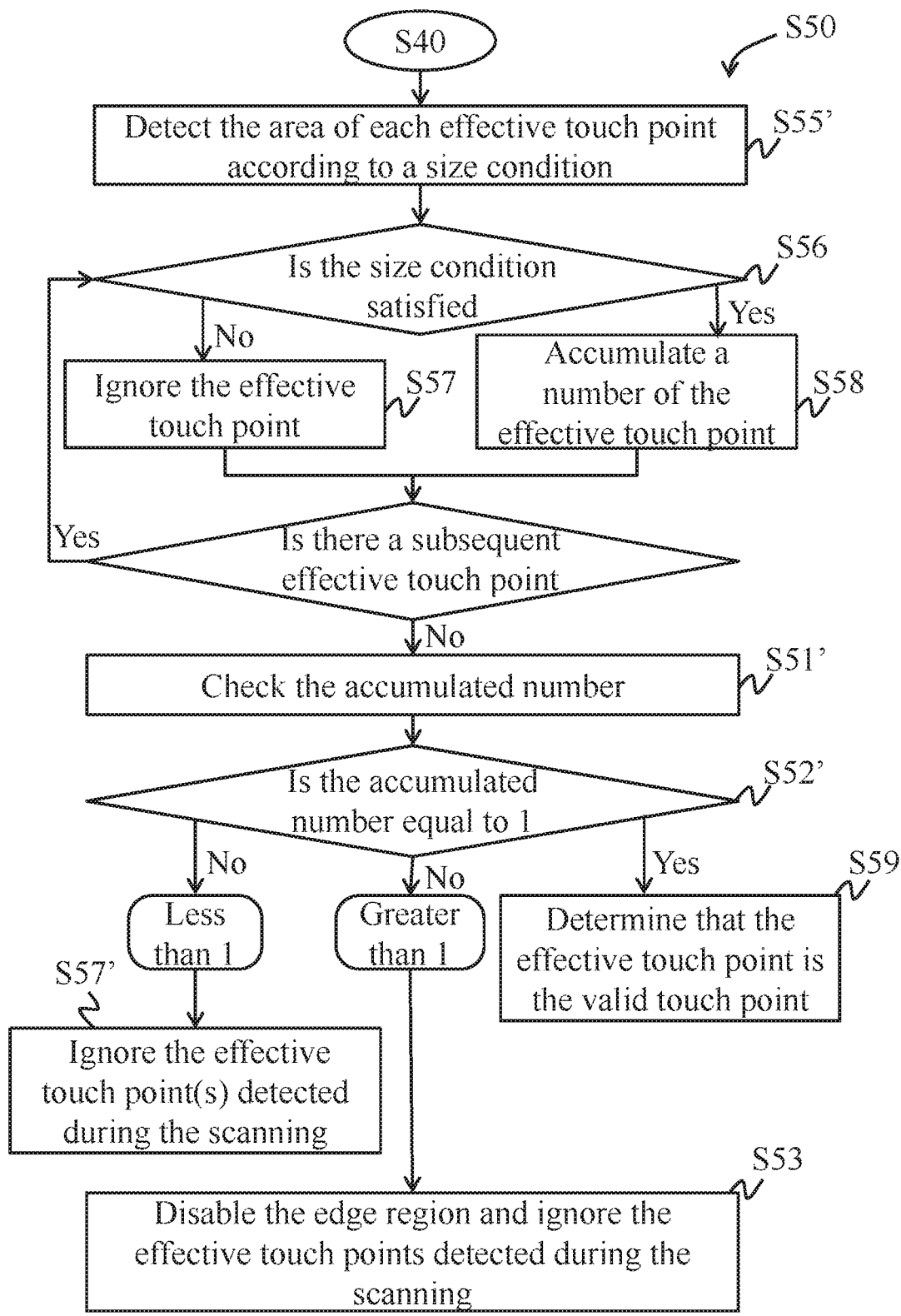
FIG. 6 illustrates a detailed flow chart of step S50 according to another embodiment.

FIG. 6 is a detailed flow chart of the step S50 according to another embodiment.

Please refer to FIG. 6. In another embodiment of the step S50, the sensing controller 12 detects the area of each of the effective touch point(s) according to the size condition (step S55') to determine whether the area of each of the effective touch point(s) satisfies the size condition (step S56).

When the area of the effective touch point does not satisfy the size condition, the sensing controller 12 ignores the effective touch point with the area being not satisfy the size condition (step S57). That is to say, the detection of the effective touch point is a false detection (which may be caused by an unintended touch movement). When the area of the effective touch point satisfies the size condition, the sensing controller 12 accumulates a number of the effective touch point(s) with the area satisfying the size condition (step S58). That is to say, the detection of the effective touch point is a true detection (which is caused by an intended touch movement).

After the areas of all of the effective touch points are checked, the sensing controller 12 checks the accumulated number (step SM') to determine whether the accumulated number is equal to 1 (step S52'). When the accumulated number of the effective touch point(s) with the area satisfying the size condition is greater than 1, the sensing controller 12 disables the edge region Ae and ignores the effective touch points having been detected during the scanning (step S53). When the accumulated number of the effective touch point(s) with the area satisfying the size condition is less than 1, the sensing controller 12 ignores the effective touch points having been detected during the scanning (step S57'). When the accumulated number of the effective touch point(s) with the area satisfying the size condition is equal to 1, the sensing controller 12 determines that the effective touch point is the valid touch point (step S59).

Figure 7:
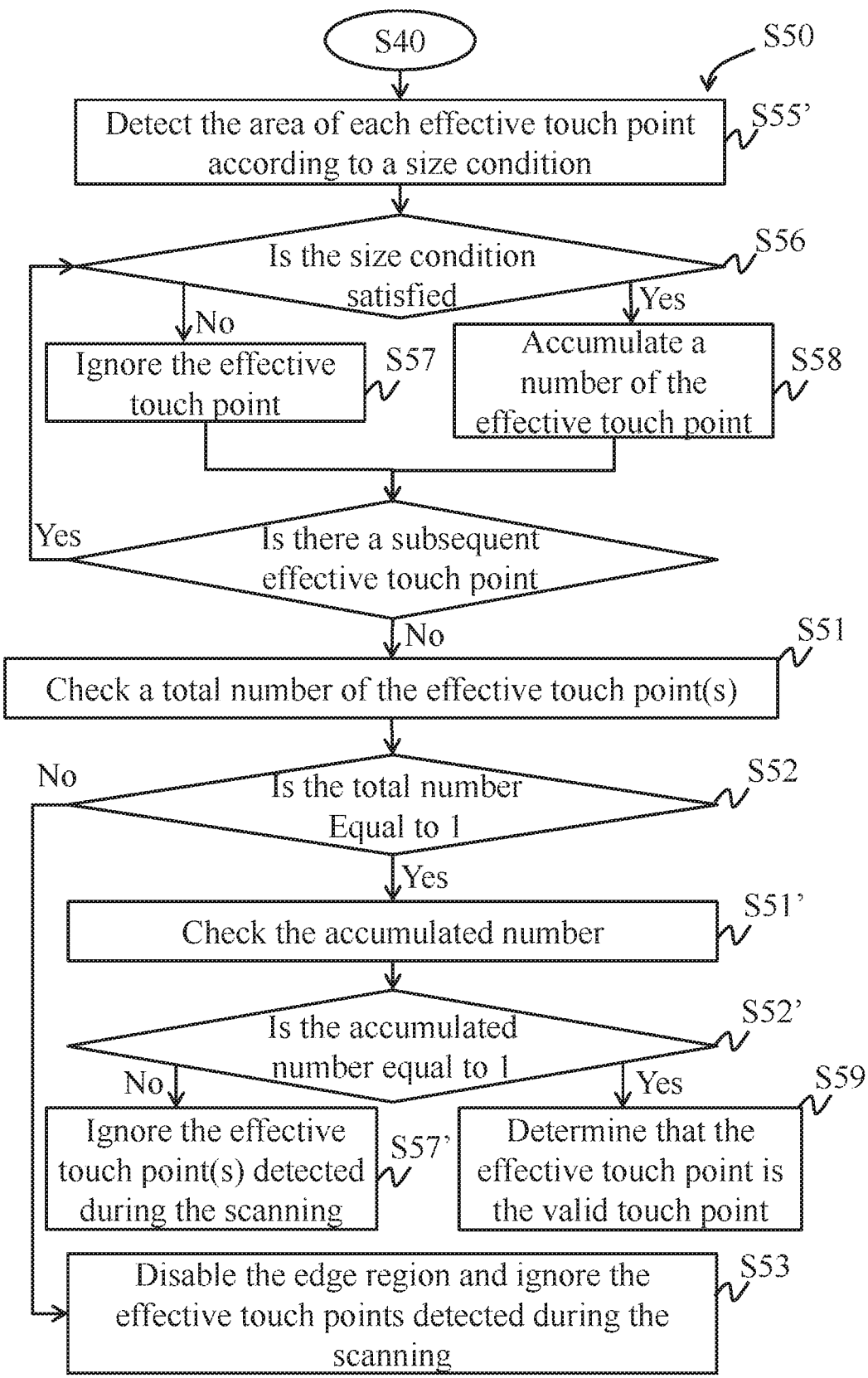
FIG. 7 illustrates a detailed flow chart of step S50 according to yet another embodiment.

FIG. 7 illustrates a detailed flow chart of the step S50 according to yet another embodiment.

Please refer to FIG. 7. In yet another embodiment of the step S50, the sensing controller 12 detects the area of each of the effective touch point(s) according to the size condition (step S55') to determine whether the area of each of the effective touch point(s) satisfies the size condition (step S56).

When the area of the effective touch point does not satisfy the size condition, the sensing controller 12 ignores the effective touch point with the area being not satisfy the size condition (step S57). That is to say, the detection of the effective touch point is a false detection (which may be caused by an unintended touch movement). When the area of the effective touch point satisfies the size condition, the sensing controller 12 accumulates a number of the effective touch point(s) with the area satisfying the size condition (step S58). That is to say, the detection of the effective touch point is a true detection (which is caused by an intended touch movement).

After the areas of all of the effective touch points are checked, the sensing controller 12 checks the total number of the effective touch point(s) (step S51) on the edge region Ae having been detected during the scanning to determine whether the total number of the effective touch point(s) is equal to 1 (step S52).

When the total number of the effective touch point(s) is not equal to 1 (in the embodiment, the total number is greater than 1), the sensing controller 12 disables the edge region Ae and ignores the effective touch points having been detected during the scanning (step S53). When the total number of the effective touch point is equal to 1, the sensing controller 12 further checks the accumulated number (step S51') to determine whether the accumulated number is equal to 1 (step S52').

When the accumulated number of the effective touch point(s) with the area satisfying the size condition is not equal to 1 (i.e., there is no effective touch point with the area satisfying the size condition), the sensing controller 12 ignores the effective touch points having been detected during the scanning (step S57'). When the accumulated number of the effective touch point(s) with the area satisfying the size condition is equal to 1, the sensing controller 12 determines that the effective touch point is the valid touch point (step S59).

In some embodiments, the size condition may relate to a fingertip area. For example, in cases of the number of the sensing points being adopted as a reference of the area, the fingertip area can be an integer such as 3 (three sensing points), 4, 5, or more. In an embodiment, the size condition may be the sensing points of which the number being greater than a predetermined number. For example, in cases of the size condition being the sensing points of which the number is less than or equal to 3 (the number of the sensing points being adopted as a reference of the area), the sensing controller 12 ignores the effective touch point when the number of the sensing points of the effective touch point is greater than 3. In contrast, the sensing controller 12 determines that the effective touch point is a valid touch point when the number of the sensing points of the effective touch point is less than or equal to 3. In another embodiment, the size condition may be the sensing points of which the number being greater than a first predetermined number and less than a second predetermined number. For example, in cases of the size condition being the sensing points of which the number is greater than 2 and is less than 6 (the number of the sensing points being adopted as a reference of the area), the sensing controller 12 ignores the effective touch point when the number of the sensing points of the effective touch point is less than or equal to 2 or is greater than or equal to 6. In contrast, the sensing controller 12 determines that the effective touch point is a valid touch point when the number of the sensing points of the effective touch point is greater than 2 and is less than 6.

In some embodiments, the touch sensing device may further comprise a storage unit 18. The storage unit 18 is connected to the sensing controller 12. The storage unit 18 may be disposed at the external of the sensing controller 12 or may be installed at the internal the sensing controller 12.

Figure 8:
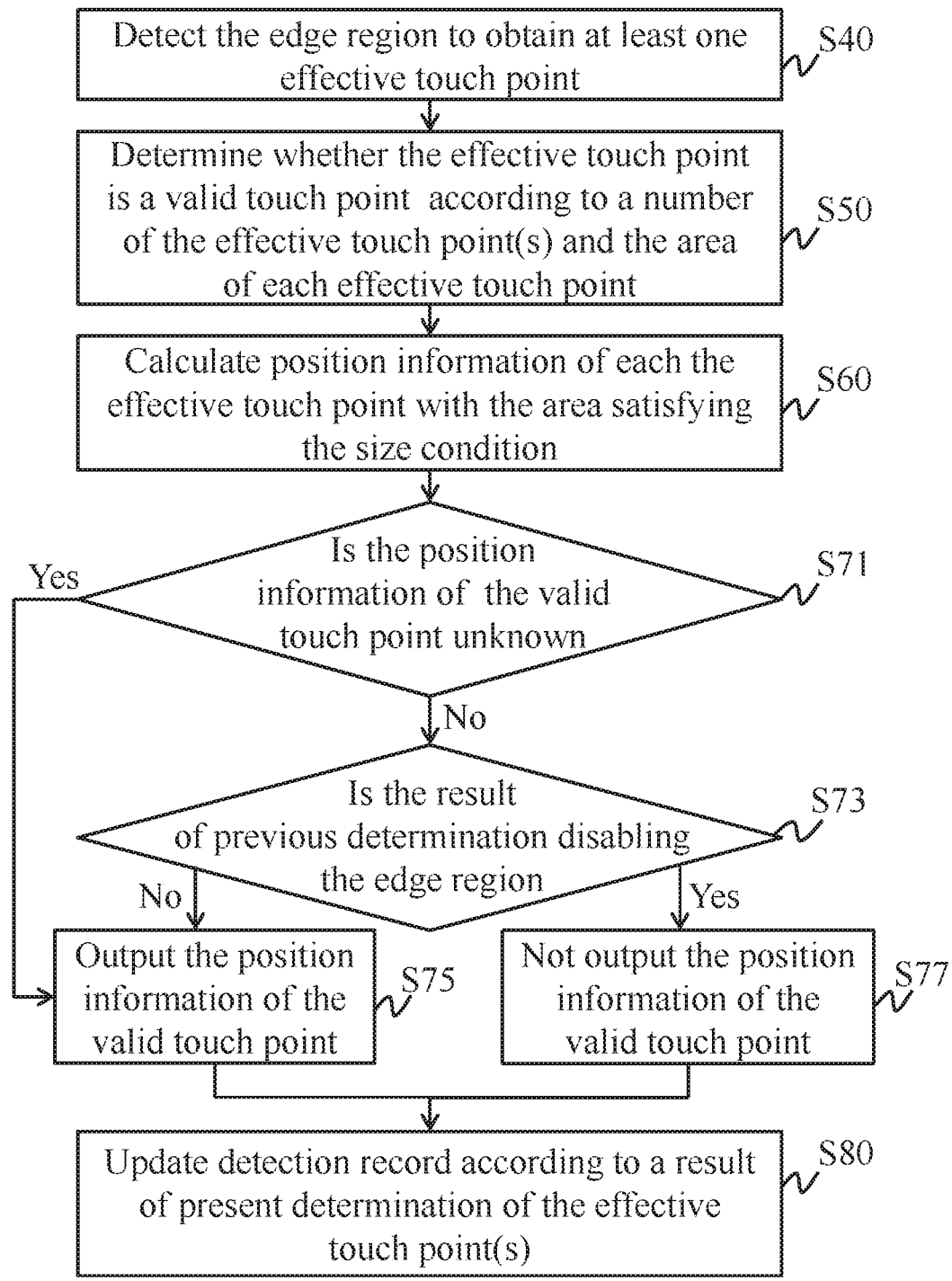
FIG. 8 illustrates a flow chart of a sensing method of touch point according to another embodiment of the instant disclosure.

FIG. 8 is a flow chart of a sensing method of touch point according to another embodiment of the instant disclosure.

Please refer to FIG. 8. In some embodiments, the sensing controller 12 records results of every determination process (the step S50) in the storage unit 18 after every scanning and determination process (e.g., after the step S53, the step S57, and the step S59 of FIG. 5 or after the step S53, the step S57, and the step S59 of FIGS. 6 and 7). In other words, After the step S53, S57, S57', and S59, the sensing controller 12 updates a detection record stored in the storage unit 18 according to a result of present determination of the effective touch point(s) (step S80). The result of every determination process in the detection record includes a number of the detection of the effective touch point pertaining to false detection, a number of the detection of the effective touch point pertaining to true detection, position information of the valid touch point, and information about whether the edge region is disabled or not.

In some embodiments, after checking the areas of all of the effective touch points, the sensing controller 12 calculates the position information of each of the effective touch points with the area satisfying the size condition (step S60). In the embodiment, the result of every determination process in the detection record further includes the position information of each of the effective touch points with the area satisfying the size condition among all of the effective touch points obtained during the scanning.

In some embodiments, after the valid touch point is obtained, the sensing controller 12 checks whether the position information of the valid touch point is unknown (step S71). That is to say, the sensing controller 12 checks whether the result of previous determination recorded in the detection record includes the same position information.

When the position information of the valid touch point is unknown (i.e., the result of previous determination does not include the same position information), the sensing controller 12 outputs the position information of the valid touch point to the post stage components (step S75).

When the position information of the valid touch point is not unknown (i.e., the result of previous determination has already included the same position information), the sensing controller 12 checks whether the result of previous determination is disabling the edge region (step S73), i.e., the sensing controller 12 checks whether the result of previous determination recorded in the detection record includes a record of "the edge region being disabled".

When the result of previous determination is disabling the edge region, the sensing controller 12 ignores the valid touch point, i.e., the sensing controller 12 does not output the position information of the valid touch point (step S75).

When the result of previous determination is not disabling the edge region, the sensing controller 12 outputs the position information of the valid touch point (step S75).

Figure 9:
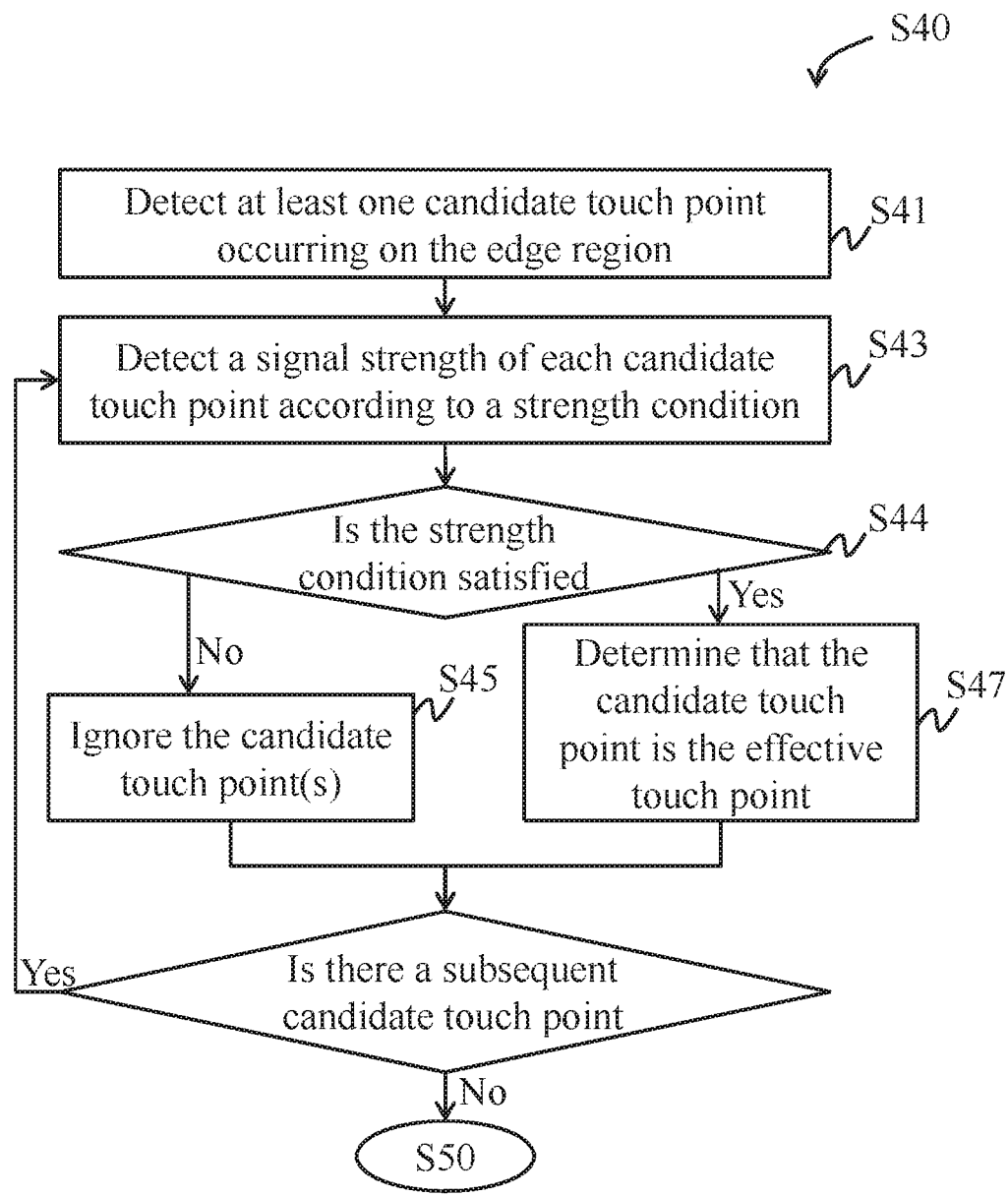
FIG. 9 illustrates a flow chart of step S40 according to an embodiment.

FIG. 9 is a flow chart of the step S40 according to an embodiment.

Please refer to FIG. 9. In an embodiment of the step S40, the sensing controller 12 detects at least one candidate touch point occurring on the edge region Ae by scanning the electrode lines (step S41). The sensing controller 12 detects a signal strength of each of the candidate touch point(s) according to a strength condition (step S43) to check whether the signal strength of each of the candidate touch point(s) satisfies the strength condition (step S44). Each of the candidate touch point(s) is formed by multiple sensing points. In the embodiment, the signal strength of each of the candidate touch point(s) can be a mean value or a peak value of the signal strength of the sensing points.

When the signal strength of the candidate touch point(s) does not satisfy the strength condition, the sensing controller 12 ignores the candidate touch point(s) (step S45) and continuously determines whether the signal strength of subsequent candidate touch point(s) satisfies the strength condition until all of the candidate touch points are determined. When the signal strength of the candidate touch point(s) satisfies the strength condition, the sensing controller 12 determines that the candidate touch point is an effective touch point (step S47) and continuously determines whether the signal strength of subsequent candidate touch point(s) satisfies the strength condition until all of the candidate touch points are determined.

In some embodiments, satisfying the strength condition means that the signal strength is within a predetermined strength range. In other words, when the signal strength of the candidate touch point is not within the predetermined strength range, the sensing controller 12 ignores the candidate touch point. In contrast, when the signal strength of the candidate touch point is within the predetermined strength range, the sensing controller 12 determines that the candidate touch point is the effective touch point.

In other embodiments, satisfying the strength condition may also mean that the signal strength is greater than or equal to a predetermined strength. In other words, when the signal strength of the candidate touch point is less than the predetermined strength, the sensing controller 12 ignores the candidate touch point. In contrast, when the signal strength of the candidate touch point is greater than or equal to the predetermined strength, the sensing controller 12 determines that the candidate touch point is the effective touch point.

It shall be understood that the sequence of each step is not limited by the aforementioned description. For example, the step S60 is, but is not limited to, processed after the step S50 in the drawing; however, the step S60 may be processed during the process of the step S50. That is to say, the step S60 is processed after the areas of all of the effective touch points are checked and before checking the position information of the valid touch point (between the step S56 and the step S71).

In some embodiments, the storage unit may store programs, parameters, and data required for operation (e.g., programs, a valid touch point, a size condition, a first parameter, a second parameter, a strength condition, or a combination thereof utilized for the practice of any embodiment of the sensing method of touch point). The storage unit may be practiced by one or more memory components. Each memory component may be a read only memory, a random access memory, a volatile memory, a non-volatile memory, a static memory, a dynamic memory, a flash memory, and/or any equipment capable of storing digital information.

In some embodiments, the sensing method of touch point(s) according to the instant disclosure may be practiced by a computer program product. As a result, a computer (i.e., any touch equipment) may load and execute programs to perform the sensing method of touch point(s) according to any embodiment of the instant disclosure. In some embodiments, the computer program product may be a readable storage medium. The aforementioned program may be stored in the readable storage medium loadable to computers. In some embodiments, the aforementioned program may be a computer program product itself and may be transmitted to computers in a wire or a wireless manner.

Concisely, the touch sensing device and the sensing method of touch point according to the instant disclosure can be utilized to determine whether a touch event is caused by a palm so as to eliminate false detections caused by palms.

What is claimed is:

1. A sensing method of touch point, comprising:
    detecting an edge region to obtain at least one effective touch point; and
    determining whether the at least one effective touch point is a valid touch point according to a number of the at least one effective touch point and an area of each of the at least one effective touch point, wherein the valid touch point is the at least one effective touch point with the number being equal to 1 and the area satisfying a size condition;

wherein the sensing method further comprising:
checking whether position information of the valid touch point is unknown;
outputting, when the position information of the valid touch point is unknown, the position information of the valid touch point;
checking whether a result of previous determination is disabling the edge region when the position information of the valid touch point is not unknown;
not outputting the position information of the valid touch point when the result of previous determination is disabling the edge region; and
outputting the position information of the valid touch point when the result of previous determination is not disabling the edge region.

2. The sensing method of touch point of claim 1, wherein the step of determining whether the at least one effective touch point is the valid touch point according to the number of the at least one effective touch point and the area of each of the at least one effective touch point comprises:
confirming a total number of the at least one effective touch point;
disabling the edge region when the total number is greater than 1;
detecting the area of the effective touch point according to the size condition when the total number is equal to 1;
ignoring the effective touch point when the area does not satisfy the size condition; and
determining the effective touch point is the valid touch point when the area satisfies the size condition.

3. The sensing method of touch point of claim 1, wherein the step of determining whether the at least one effective touch point is the valid touch point according to the number of the at least one effective touch point and the area of each of the at least one effective touch point comprises:
detecting the area of each of the at least one effective touch point according to the size condition;
ignoring the effective touch point when the area does not satisfy the size condition;
accumulating a number of the effective touch point with the area satisfying the size condition when the area satisfies the size condition;
disabling the edge region when the accumulated number is greater than 1; and
determining the effective touch point with the area satisfying the size condition is the valid touch point when the accumulated number is equal to 1.

4. The sensing method of touch point of claim 1, wherein the step of determining whether the at least one effective touch point is the valid touch point according to the number of the at least one effective touch point and the area of each of the at least one effective touch point comprises:
detecting the area of each of the at least one effective touch point according to the size condition;
ignoring the effective touch point when the area does not satisfy the size condition;
accumulating a number of the effective touch point with the area satisfying the size condition when the area satisfies the size condition;
checking a total number of the at least one effective touch point;
disabling the edge region when the total number is greater than 1; and
determining the effective touch point with the area satisfying the size condition is the valid touch point when the total number is equal to 1 and the accumulated number is equal to 1.

5. The sensing method of touch point of claim 1, wherein the step of detecting the edge region to obtain the at least one effective touch point comprises:
detecting at least one candidate touch point occurring on the edge region;
detecting a signal strength of each of the at least one candidate touch point according to a strength condition;
ignoring, when the signal strength does not satisfy the strength condition, the candidate touch point with the signal strength being not satisfy the strength condition; and
determining, when the signal strength satisfies the strength condition, that the candidate touch point with the signal strength satisfying the strength condition is the effective touch point.

6. The sensing method of touch point of claim 1, further comprising:
updating a detection record according to a result of present determination of the at least one effective touch point.

7. The sensing method of touch point of claim 1, further comprising:
calculating position information of each of the at least one effective touch point with the area satisfying the size condition.

8. The sensing method of touch point of claim 7, further comprising:
updating a detection record according to a result of present determination of the at least one effective touch point.

9. The sensing method of touch point of claim 1, wherein the size condition relates to a fingertip area.

10. A touch sensing device processing the sensing method of touch point of claim 1, wherein the touch sensing device comprises a plurality of first electrode lines and a plurality of second electrode lines, and the edge region is a sensing block formed by the first electrode lines near a first side of the touch sensing device, the first electrode lines near a second side of the touch sensing device, the second electrode lines near a third side of the touch sensing device, and the second electrode lines near a fourth side of the touch sensing device.

11. A touch sensing device, comprising:
a plurality of first electrode lines;
a plurality of second electrode lines, the first electrode lines and the second electrode lines intersecting to define a plurality of sensing points arranged as a matrix, the sensing points forming a sensing region; and
a sensing controller electrically connected with the first electrode lines and the second electrode lines, the sensing controller processing:
detecting an edge region of the overall sensing region to obtain at least one effective touch point, wherein each of the at least one effective touch point is formed by the sensing points adjacent to one another; and
determining whether the at least one effective touch point is a valid touch point according to a number of the at least one effective touch point and an area of each of the at least one effective touch point, wherein the valid touch point is the at least one effective touch point with the number being equal to 1 and the area satisfying a size condition;
wherein the sensing controller further processes:
checking whether position information of the valid touch point is unknown;

outputting, when the position information of the valid touch point is unknown, the position information of the valid touch point;

checking, when the position information of the valid touch point is not unknown, whether a result of previous determination is disabling the edge region;

not outputting, when the result of previous determination is disabling the edge region, the position information of the valid touch point; and outputting, when the result of previous determination is not disabling the edge region, the position information of the valid touch point.

12. The touch sensing device of claim 11, further comprising:

a storage unit electrically connected to the sensing controller and storing a detection record, wherein the detection record comprises a result of previous determination of each of the at least one effective touch point;

wherein, the sensing controller further processes: updating the detection record according to a result of present determination of the at least one effective touch point.

13. The touch sensing device of claim 11, further comprising:

a storage unit electrically connected to the sensing controller and storing a detection record, wherein the detection record comprises a result of previous determination of each of the at least one effective touch point;

wherein, the sensing controller further processes: calculating position information of each of the at least one effective touch point with the area satisfying the size condition and updating the detection record according to a result of present determination of the at least one effective touch point.

14. The touch sensing device of claim 11, wherein a signal strength of each of the at least one effective touch point satisfies a strength condition.

15. The touch sensing device of claim 11, wherein the size condition relates to a fingertip area.

16. The touch sensing device of claim 11, wherein the edge region is a sensing block formed by the first electrode lines near a first side of the sensing region, the first electrode lines near a second side of the sensing region, the second electrode lines near a third side of the sensing region, and the second electrode lines near a fourth side of the sensing region.

* * * * *